(12) United States Patent
Wu

(10) Patent No.: US 9,568,968 B2
(45) Date of Patent: Feb. 14, 2017

(54) POWER CONTROL SYSTEM

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventor: Zhong-Gang Wu, Wuhan (CN)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 81 days.

(21) Appl. No.: 14/714,377

(22) Filed: May 18, 2015

(65) Prior Publication Data

US 2016/0274630 A1    Sep. 22, 2016

(30) Foreign Application Priority Data

Mar. 20, 2015  (CN) .......................... 2015 1 0123437

(51) Int. Cl.
  *G06F 1/26*  (2006.01)
  *G06F 1/32*  (2006.01)
  *G06F 1/00*  (2006.01)

(52) U.S. Cl.
  CPC .. *G06F 1/26* (2013.01); *G06F 1/32* (2013.01)

(58) Field of Classification Search
  CPC ...................................... G06F 1/26; G06F 1/32
  See application file for complete search history.

(56) References Cited

U.S. PATENT DOCUMENTS

| | | | |
|---|---|---|---|
| 6,198,913 B1* | 3/2001 | Sung ................ | H04W 52/0241 340/10.33 |
| 2008/0079467 A1* | 4/2008 | Hou .................... | H03K 17/223 327/143 |
| 2013/0080798 A1* | 3/2013 | Nakao .................... | G06F 1/263 713/300 |

FOREIGN PATENT DOCUMENTS

| JP | 04322136 A | * | 11/1992 |
|---|---|---|---|
| JP | 2010282260 A | * | 12/2010 |

* cited by examiner

*Primary Examiner* — Phil Nguyen
(74) *Attorney, Agent, or Firm* — Zhigang Ma

(57) ABSTRACT

A power control system includes a first comparison unit, a second comparison unit, a switching unit, and a power supply unit. The first comparison unit receives a switch voltage and a first reference voltage, compares the switch voltage with the first reference voltage and outputs a first comparison voltage. The second comparison unit receives the first comparison voltage and a second reference voltage, compares the first comparison voltage with the second reference voltage and outputs a second comparison voltage. The switching unit receives the second comparison voltage and converts a power control voltage to the switch voltage. The power supply unit receives the switch voltage and outputs a working voltage to wake up a motherboard. The power supply unit only wakes up the motherboard when the power supply unit is completely discharged.

16 Claims, 2 Drawing Sheets

POWER CONTROL SYSTEM

CROSS-REFERENCE TO RELATED APPLICATIONS

This application claims priority to Chinese Patent Application No. 201510123437.9 filed on Mar. 20, 2015, the contents of which are incorporated by reference herein in its entirety.

FIELD

The subject matter herein generally relates to a power control system.

BACKGROUND

Personal computers usually have power supply units which provide direct current (DC) voltages to motherboards in the computers. The conventional power supply units have under voltage protection function. The computers tend to malfunction when being waken up from a sleep state.

BRIEF DESCRIPTION OF THE DRAWINGS

Implementations of the present technology will now be described, by way of example only, with reference to the attached figures.

DETAILED DESCRIPTION

Figure 1:
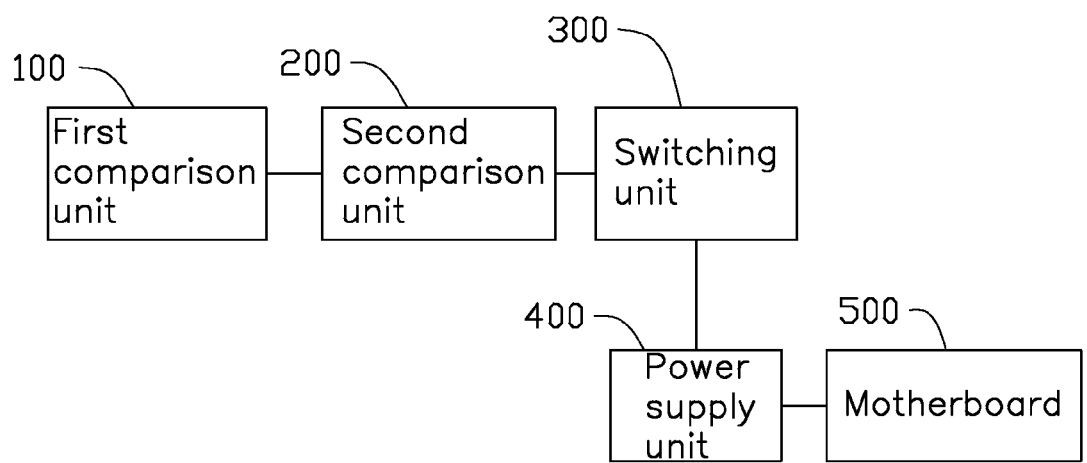
FIG. 1 is a block diagram of an embodiment of a power control system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like. "Unit" means a collection of electronic hardware alone or in combination with software configured for a particular task or function, although units may overlap or share components.

FIG. 1 illustrates a power control system in accordance with one embodiment. The power control system includes a first comparison unit 100, a second comparison unit 200, and a switching unit 300. The first comparison unit 100 is configured to receive a switch voltage from the switching unit 300 and receive a first reference voltage, compare the switch voltage with the first reference voltage and output a first comparison voltage. The second comparison unit 200 is configured to receive the first comparison voltage and a second reference voltage, compare the first comparison voltage with the second reference voltage and output a second comparison voltage. The switching unit 300 is configured to receive the second comparison voltage, and convert a power control voltage to the switch voltage in dependence on the second comparison voltage. A power supply unit 400 is configured to receive the switch voltage and provide a working voltage for a motherboard 500 in dependence on the switch voltage.

Figure 2:
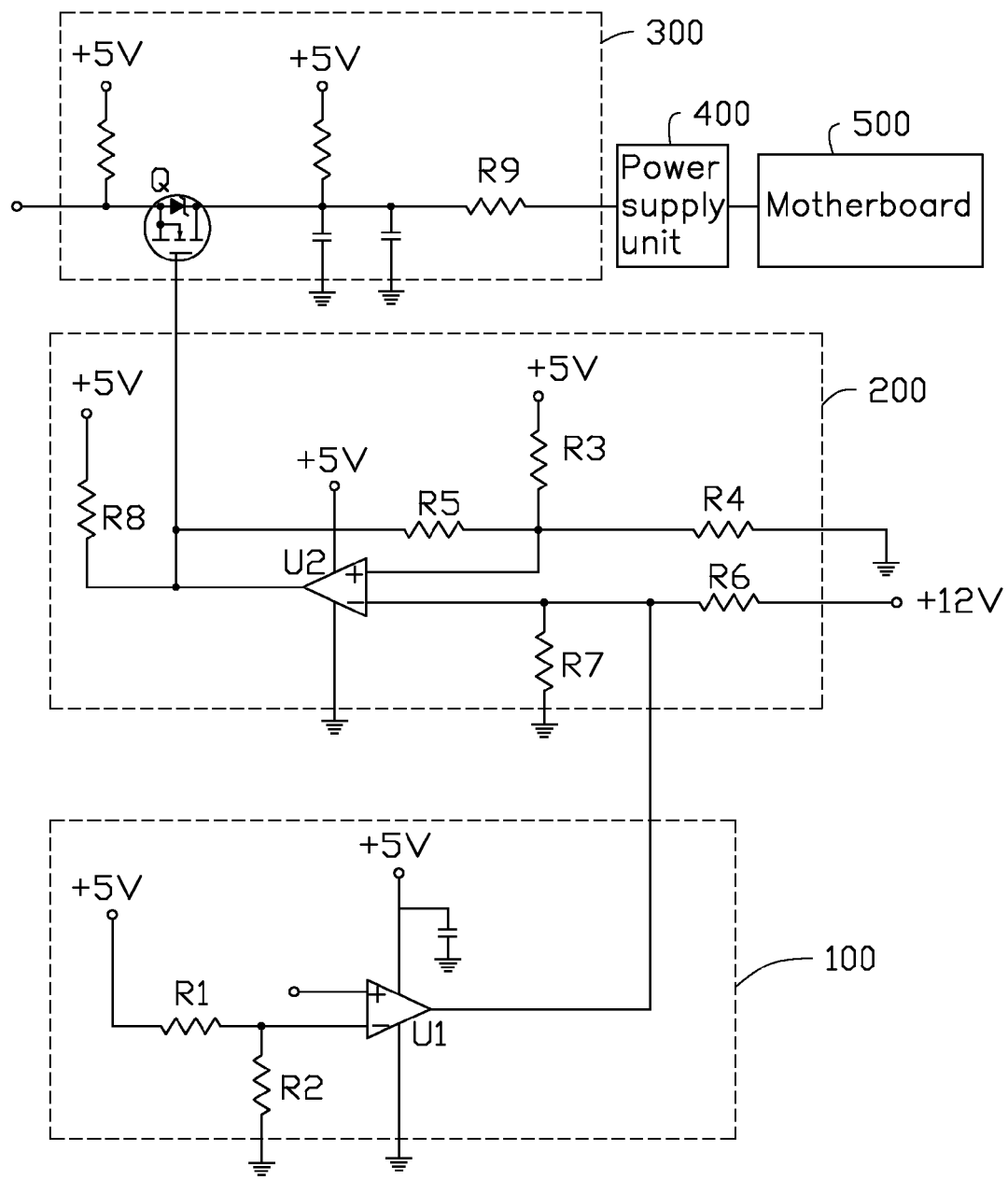
FIG. 2 is a circuit diagram of the power control system of FIG. 1.

FIG. 2 illustrates that the first comparison unit 100 includes a first comparator U1. The first comparator U1 includes a non-inverting input terminal, an inverting input terminal, and an output terminal. The non-inverting input terminal of the first comparator U1 is configured to receive the switch voltage. The inverting input terminal of the first comparator U1 is configured to receive a direct voltage (DC) voltage via a first resistor R1. The inverting input terminal of the first comparator U1 is grounded via a second resistor R2. The output terminal of the first comparator U1 is configured to output the first comparison voltage. The DC voltage generates the first reference voltage to the inverting input terminal of the first comparator U1 via the first resistor R1 and the second resistor R2.

In at least one embodiment, a resistance of the each of the first resistor R1 and the second resistor R2 is 100 kilo-ohms, and the DC voltage is +5 volts.

The second comparison unit 200 includes a second comparator U2. The second comparator U2 includes a non-inverting input terminal, an inverting input terminal, and an output terminal. The non-inverting input terminal of the second comparator U2 is configured to receive the DC voltage via a third resistor R3. The non-inverting input terminal of the second comparator U2 is grounded via a fourth resistor R4. The non-inverting input terminal of the second comparator U2 is electrically coupled to the output terminal of the second comparator U2 via a fifth resistor R5. The inverting input terminal of the second comparator U2 is configured to receive the working voltage via a sixth resistor R6. The inverting input terminal of the second comparator U2 is grounded via a seventh resistor R7. The output terminal of the second comparator U2 is configured to receive the DC voltage via an eighth resistor R8. The DC voltage generates the second reference voltage at the non-inverting input terminal of the second comparator U2 by the third resistor R3, the fourth resistor R4, the fifth resistor R5, and the eighth resistor R8.

In at least one embodiment, a resistance of the third resistor R3 is 100 kilo-ohms, a resistance of each of the fourth resistor R4 and the fifth resistor R5 is 20 kilo-ohms, a resistance of the sixth resistor R6 is 15 kilo-ohms, a resistance of the seventh resistor R7 is 10 kilo-ohms, a resistance of the eighth resistor R8 is 1 kilo-ohms, and the working voltage is +12 volts.

The switching unit 300 includes a switch unit Q. The switch unit Q includes a first terminal, a second terminal, and a third terminal. The first terminal of the switch unit Q is electrically coupled to the output terminal of the second comparator U2. The second terminal of the switch unit Q is configured to receive the power control voltage. The third terminal of the switch unit Q is electrically coupled to the power supply unit 400 via a ninth resistor R9.

In at least one embodiment, the switch unit Q is an n-channel metal-oxide-semiconductor field-effect transistor (MOSFET), and the first terminal, the second terminal, and the third terminal of the switch unit Q are respectively gate, source, and drain.

In use, the switch voltage is a +5 volts high voltage level before the motherboard 500 is power on. The first reference voltage generated by the DC voltage is +2.5 volts. The first comparison voltage output by the output terminal of the first comparator U1 is at a low voltage level. A voltage level at the non-inverting input terminal of the second comparator U2 is greater than a voltage level at the inverting input terminal of the second comparator U2 after the motherboard 500 is power on. The output terminal of the second comparator U2 is configured to output the second comparison voltage at a high voltage level. The first terminal of the switch unit Q is configured to receive the second comparison voltage at the high voltage level. The switch unit Q turns on. The switch unit Q converts the power control voltage at a low voltage level to the switch voltage at a low voltage level. The power supply unit 400 receives the switch voltage at the low voltage level, and outputs the working voltage to the motherboard 500.

While the motherboard 500 is power on, the second reference voltage generated by the DC voltage is +2.67 volts. The non-inverting input terminal of the first comparator U1 remains to receive the switch voltage at the low voltage level. The voltage level at the non-inverting input terminal of the first comparator U1 is less than a voltage level at the inverting input terminal of the first comparator U1. The first comparison voltage output by the output terminal of the first comparator U1 remains the low voltage level. The voltage level at the inverting input terminal of the second comparator U2 is less than the voltage level at the non-inverting input terminal of the second comparator U2. The output terminal of the second comparator U2 remains to output the second comparison voltage at the high voltage level. The switch unit Q remains turned on.

When the motherboard 500 enters a sleep state, the switch voltage returns to the +5 volts high voltage level. The first comparison voltage output by the output terminal of the first comparator U1 returns to the low voltage level. A voltage on the inverting input terminal of the second comparator U2 generated by the +12 volts working voltage decreases from +4.8 volts. The voltage level at the inverting input terminal of the second comparator U2 is greater than the voltage level at the non-inverting input terminal of the second comparator U2. The output terminal of the second comparator U2 is configured to output the second comparison voltage at a low voltage level. The first terminal of the switch unit Q is configured to receive the second comparison voltage at the low voltage level. The switch unit Q turns off. The switch unit Q cannot convert the power control voltage at the low voltage level to the switch voltage at the low voltage level. The power supply unit 400 cannot output the working voltage to wake up the motherboard 500 in dependence on the switch voltage at the low voltage level.

While the power supply unit 400 is discharging, the second reference voltage generated by the DC voltage is +0.45 volts. The output terminal of the second comparator U2 only outputs the second comparison voltage at the high voltage level when the voltage level at the inverting input terminal of the second comparator U2 is less than the voltage level at the non-inverting input terminal of the second comparator U2, i.e. when the +12 volts working voltage is discharged to less than +1.125 volts. The switch unit Q turns on. The switch unit Q converts the power control voltage at the low voltage level to the switch voltage at the low voltage level. The power supply unit 400 outputs the working voltage to wake up the motherboard 500 in dependence on the switch voltage at the low voltage level. The power supply unit 400 only wakes up the motherboard 500 when the power supply unit 400 is completely discharged, and malfunction of the motherboard 500 is avoided.

The embodiments shown and described above are only examples. Many details are often found in the art such as the other features of a power control system. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A power control system comprising:
   a first comparison unit configured to receive a switch voltage and a first reference voltage, compare the switch voltage with the first reference voltage and output a first comparison voltage;
   a second comparison unit configured to receive the first comparison voltage and a second reference voltage, compare the first comparison voltage with the second reference voltage and output a second comparison voltage;
   a switching unit configured to receive the second comparison voltage and convert a power control voltage to the switch voltage in dependence on the second comparison voltage; and
   a power supply unit configured to receive the switch voltage and output a working voltage to wake up a motherboard in dependence on the switch voltage, wherein the power supply unit only wakes up the motherboard when the power supply unit is completely discharged;
   wherein the first comparison unit comprises a first comparator; the first comparator comprises a non-inverting input terminal, an inverting input terminal, and an output terminal; the non-inverting input terminal of the first comparator is configured to receive the switch voltage; the inverting input terminal of the first comparator is configured to receive a direct voltage (DC) voltage via a first resistor; the inverting input terminal of the first comparator is grounded via a second resistor; the output terminal of the first comparator is configured to output the first comparison voltage; and the DC voltage generates the first reference voltage at the inverting input terminal of the first comparator by the first resistor and the second resistor.

2. The power control system of claim 1, wherein a resistance of the each of the first resistor and the second resistor is 100 kilo-ohms; and the DC voltage is +5 volts.

3. The power control system of claim 1, wherein the second comparison unit comprises a second comparator; the second comparator comprises a non-inverting input terminal, an inverting input terminal, and an output terminal; the non-inverting input terminal of the second comparator is configured to receive the DC voltage via a third resistor; the non-inverting input terminal of the second comparator is grounded via a fourth resistor; the non-inverting input terminal of the second comparator is electrically coupled to the output terminal of the second comparator via a fifth resistor; the inverting input terminal of the second comparator is configured to receive the working voltage via a sixth resistor; the inverting input terminal of the second comparator is grounded via a seventh resistor; the output terminal of the second comparator is configured to receive the DC voltage via an eighth resistor; and the DC voltage generates the second reference voltage at the non-inverting input terminal of the second comparator by the third resistor, the fourth resistor, the fifth resistor, and the eighth resistor.

4. The power control system of claim 3, wherein a resistance of the third resistor is 100 kilo-ohms; a resistance of each of the fourth resistor and the fifth resistor is 20 kilo-ohms; a resistance of the sixth resistor is 15 kilo-ohms; a resistance of the seventh resistor is 10 kilo-ohms; a resistance of the eighth resistor is 1 kilo-ohms; and the working voltage is +12 volts.

5. The power control system of claim 4, wherein the first reference voltage generated by the DC voltage is +2.5 volts.

6. The power control system of claim 4, wherein the second reference voltage generated by the DC voltage is +2.67 volts during the motherboard is power on; and the second reference voltage generated by the DC voltage is +0.45 volts during the power supply unit is discharged.

7. The power control system of claim 3, wherein the switching unit comprises a switch unit; the switch unit comprises a first terminal, a second terminal, and a third terminal; the first terminal of the switch unit is electrically coupled to the output terminal of the second comparator; the second terminal of the switch unit is configured to receive the power control voltage; and the third terminal of the switch unit is electrically coupled to the power supply unit via a ninth resistor.

8. The power control system of claim 7, wherein the switch unit is an n-channel metal-oxide-semiconductor field-effect transistor (MOSFET); and the first terminal, the second terminal, and the third terminal of the switch unit are respectively gate, source, and drain.

9. A power control system comprising:
a first comparison unit configured to receive a switch voltage and a first reference voltage, compare the switch voltage with the first reference voltage and output a first comparison voltage;
a second comparison unit configured to receive the first comparison voltage and a second reference voltage, compare the first comparison voltage with the second reference voltage and output a second comparison voltage;
a switching unit comprising a switch unit configured to receive the second comparison voltage and convert a power control voltage to the switch voltage in dependence on the second comparison voltage; and
a power supply unit configured to receive the switch voltage and output a working voltage to wake up a motherboard in dependence on the switch voltage, wherein when the switch unit receives the second comparison voltage at a first voltage level, the switch unit turns off and cannot convert the power control voltage at the first voltage level to the switch voltage at the first voltage level, and the power supply unit cannot output the working voltage to wake up the motherboard in dependence on the switch voltage at the first voltage level; and when the switch unit receives the second comparison voltage at a second voltage level, the switch unit turns on and convert the power control voltage at the first voltage level to the switch voltage at the first voltage level, and the power supply unit outputs the working voltage to wake up the motherboard when the power supply unit is completely discharged;
wherein the first comparison unit comprises a first comparator; the first comparator comprises a non-inverting input terminal, an inverting input terminal, and an output terminal; the non-inverting input terminal of the first comparator is configured to receive the switch voltage; the inverting input terminal of the first comparator is configured to receive a direct voltage (DC) voltage via a first resistor; the inverting input terminal of the first comparator is grounded via a second resistor; the output terminal of the first comparator is configured to output the first comparison voltage; and the DC voltage generates the first reference voltage at the inverting input terminal of the first comparator by the first resistor and the second resistor.

10. The power control system of claim 9, wherein a resistance of the each of the first resistor and the second resistor is 100 kilo-ohms; and the DC voltage is +5 volts.

11. The power control system of claim 9, wherein the second comparison unit comprises a second comparator; the second comparator comprises a non-inverting input terminal, an inverting input terminal, and an output terminal; the non-inverting input terminal of the second comparator is configured to receive the DC voltage via a third resistor; the non-inverting input terminal of the second comparator is grounded via a fourth resistor; the non-inverting input terminal of the second comparator is electrically coupled to the output terminal of the second comparator via a fifth resistor; the inverting input terminal of the second comparator is configured to receive the working voltage via a sixth resistor; the inverting input terminal of the second comparator is grounded via a seventh resistor; the output terminal of the second comparator is configured to receive the DC voltage via an eighth resistor; and the DC voltage generates the second reference voltage at the non-inverting input terminal of the second comparator by the third resistor, the fourth resistor, the fifth resistor, and the eighth resistor.

12. The power control system of claim 11, wherein a resistance of the third resistor is 100 kilo-ohms; a resistance of each of the fourth resistor and the fifth resistor is 20 kilo-ohms; a resistance of the sixth resistor is 15 kilo-ohms; a resistance of the seventh resistor is 10 kilo-ohms; a resistance of the eighth resistor is 1 kilo-ohms; and the working voltage is +12 volts.

13. The power control system of claim 12, wherein the first reference voltage generated by the DC voltage is +2.5 volts.

14. The power control system of claim 12, wherein the second reference voltage generated by the DC voltage is +2.67 volts during the motherboard is power on; and the second reference voltage generated by the DC voltage is +0.45 volts during the power supply unit is discharged.

15. The power control system of claim 11, wherein the switch unit comprises a first terminal, a second terminal, and a third terminal; the first terminal of the switch unit is electrically coupled to the output terminal of the second comparator; the second terminal of the switch unit is configured to receive the power control voltage; and the third terminal of the switch unit is electrically coupled to the power supply unit via a ninth resistor.

16. The power control system of claim 15, wherein the switch unit is an n-channel metal-oxide-semiconductor field-effect transistor (MOSFET); and the first terminal, the second terminal, and the third terminal of the switch unit are respectively gate, source, and drain.

\* \* \* \* \*